US009401507B2

(12) United States Patent
Paolella et al.

(10) Patent No.: US 9,401,507 B2
(45) Date of Patent: Jul. 26, 2016

(54) METHODS FOR THE COLLOIDAL SYNTHESIS OF LITHIUM IRON PHOSPHATE

(71) Applicant: FONDAZIONE ISTITUTO ITALIANO DI TECNOLOGIA, Genoa (IT)

(72) Inventors: Andrea Paolella, Reggio Emilia (IT); George Chandramohan, Genoa (IT); Mirko Prato, Genoa (IT); Mauro Povia, Genoa (IT); Alessandro Genovese, Turin (IT); Liberato Manna, Genoa (IT); Roberto Cingolani, Genoa (IT)

(73) Assignee: FONDAZIONE ISTITUTO ITALIANO DI TECNOLOGIA, Genoa (IT)

( * ) Notice: Subject to any disclaimer, the term of this patent is extended or adjusted under 35 U.S.C. 154(b) by 0 days.

(21) Appl. No.: 14/419,941

(22) PCT Filed: Aug. 7, 2013

(86) PCT No.: PCT/IB2013/056465
§ 371 (c)(1),
(2) Date: Feb. 6, 2015

(87) PCT Pub. No.: WO2014/024149
PCT Pub. Date: Feb. 13, 2014

(65) Prior Publication Data
US 2015/0171415 A1 Jun. 18, 2015

(30) Foreign Application Priority Data
Aug. 7, 2012 (IT) .............................. TO2012A0709

(51) Int. Cl.
*C01B 25/45* (2006.01)
*H01M 4/136* (2010.01)
(Continued)

(52) U.S. Cl.
CPC .............. *H01M 4/136* (2013.01); *C01B 25/45* (2013.01); *H01M 4/5825* (2013.01); *H01M 2004/028* (2013.01)

(58) Field of Classification Search
CPC .............. H01M 4/136; H01M 4/5258; H01M 2004/028; C01B 25/45
See application file for complete search history.

(56) References Cited

U.S. PATENT DOCUMENTS

2012/0007021 A1* 1/2012 Beppu ..................... C01B 25/37
252/182.1
2012/0058039 A1* 3/2012 Huang ................... B82Y 30/00
423/306

FOREIGN PATENT DOCUMENTS

CN 102390824 A 3/2012

OTHER PUBLICATIONS

English machine translation of CN102390824A1.*

(Continued)

*Primary Examiner* — Richard M Rump
(74) *Attorney, Agent, or Firm* — Robert E. Alderson, Jr.

(57) ABSTRACT

Methods for producing lithium iron phosphate or lithium manganese phosphate or lithium iron manganese phosphate, by colloidal synthesis are provided. Such methods include the operation of reacting a lithium salt, an iron(II) halide (and/or a manganese(II) halide) and a phosphorus compound, which, under the reaction conditions, is capable of releasing the phosphate ion, in the presence of an organic surfactant or a mixture of organic surfactants including an alkylamine or alkenylamine, in which the surfactant or mixture of surfactants is capable of dissolving the lithium salt and the iron halide (and/or the manganese halide), where used, in an organic solvent, which is liquid at room temperature, in which the surfactant or mixture of surfactants is soluble, the reaction being performed at a temperature not lower than 250° C.

10 Claims, 4 Drawing Sheets

TEM image of the LiFePO4 nanocrystals (in plate form) obtained via Example 1

(51) Int. Cl.
H01M 4/58 (2010.01)
H01M 4/02 (2006.01)

(56) References Cited

OTHER PUBLICATIONS

Doi, Takayuki, et al. "Electrochemical Insertion and Extraction of Lithium-ion at LiMnPO4 Nanocrystals Synthesized in Nonaqueous Solution." Meeting Abstracts. No. 12. The Electrochemical Society, 2008.*

Muxina Konarova, Izumi Taniguchi, Physical and electrochemical properties of LiFePO4 nanoparticles synthesized by a combination of spray pyrolysis with wet ball-milling, www.elsevier.com/locate/Jpowsour, 2009, pp. 1029-1035, Journal of Power Sources No. 194, Elsevier, Japan.

Zhihui Xu, Liang Xu, Qiongyu Lai, Xiaoyang Ji, Microemulsion synthesis of LiFePO4/C and its electrochemical properties as cathode materials for lithium-ion cells, Science Direct, www.sciencedirect.com, 2007, pp. 80-85, Materials Chemistry and Physics No. 105, Elsevier, China.

Wenxiu Peng, Lifang Jiao, Haiyan Gao, Zhan Qi, Qinghong Wang, Hongmei Du, Yuchang Si, Yijing Wang, Huatang Yuan, A novel sol-gel method based on FePO4•2H2O to synthesize submicrometer structured LiFePO4/C cathcode material, Journal of Power Sources xxx, 2010, pp. 1-7, www.elsevier.com/locate/jpowsour, China.

A. Aimable, D. Aymes, F. Bernard, F. Le Cras, Characteristics of LiFePO4 obtained through a one step continuous hydrothermal synthesis process working in supercritical water, Solid State Ionics No. 180, 2009, pp. 861-866, www.elsevier.com/locate/ssi, Elsevier, France.

Chunwen Sun, Shreyas Rajasekhara, John B. Goodenough, Feng Zhou, Monodisperse Porous LiFePO4 Microspheres for a High Power Li-Ion Battery Cathode, Journal of the American Chemical Society, 2011, pp. 2132-2135, vol. 133, American Chemical Society, United States.

Shigehisa Tajimi, Yosuke Ikeda, Kazuyoshi Uematsu, Kenji Toda, Mineo Sato, Enhanced electrochemical performance of LiFePO4 prepared by hydrothermal reaction, Science Direct, Solid State Ionics No. 175, www.sciencedirect.com, www.elsevier.com/locate/ssi, 2004, pp. 287-290, Elsevier, Japan.

Xiaojun Huang, Shengjie Yan, Huiying Zhao, Lei Zhang, Rui Guo, Chengkang Chang, Xiangyang Kong, Haibo Han, Electrochemical performance of LiFePO4 nanorods obtained from hydrothermal process, Science Direct, Materials Characterization No. 61, www.sciencedirect.com, www.elsevier.com/locate/matchar, 2010, pp. 720-725, Elsevier, China.

Dragana Jugovic, Dragan Uskokovic, A review of recent developments in the synthesis procedures of lithium iron phosphate powders, Journal of Power Sources No. 190, 2009, pp. 538-544, www.elsevier.com/locate/jpowsour, Elsevier, Serbia.

Jie Jiang, Wen Liu, Jitao Chen, Yanglong Hou, LiFePO4 Nanocrystals: Liquid-Phase Reduction Synthesis and their Electrochemical Performance, Applied Materials and Interfaces, 2012, pp. 3062-3068, vol. 4, ACS Publications, China.

* cited by examiner

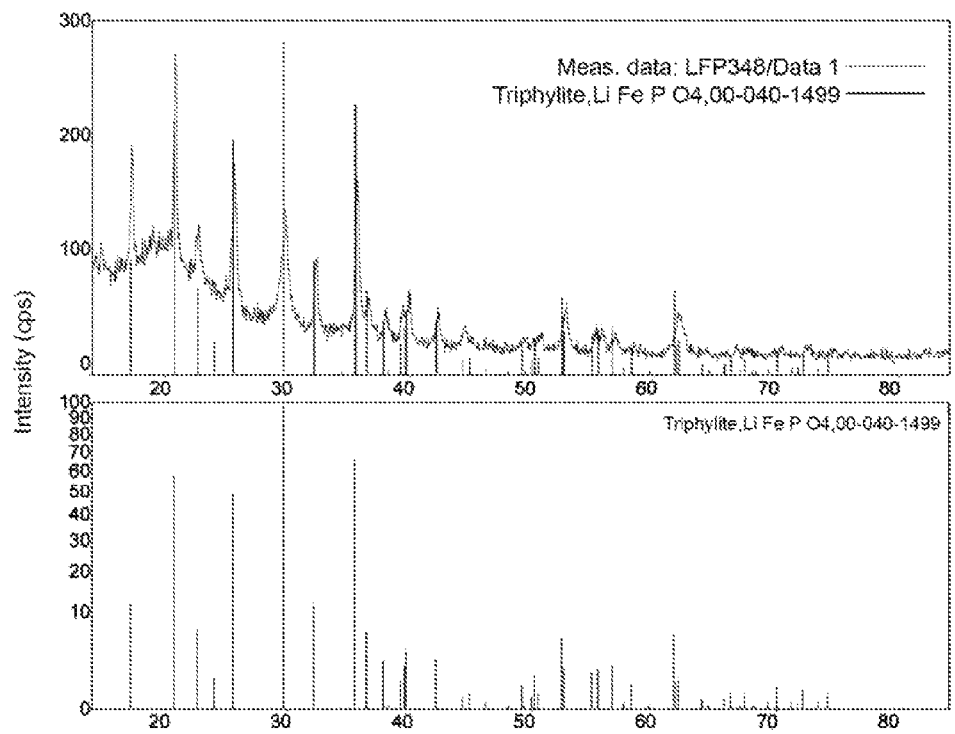
Figure 1: XRD spectrum of the powder obtained via Example 1
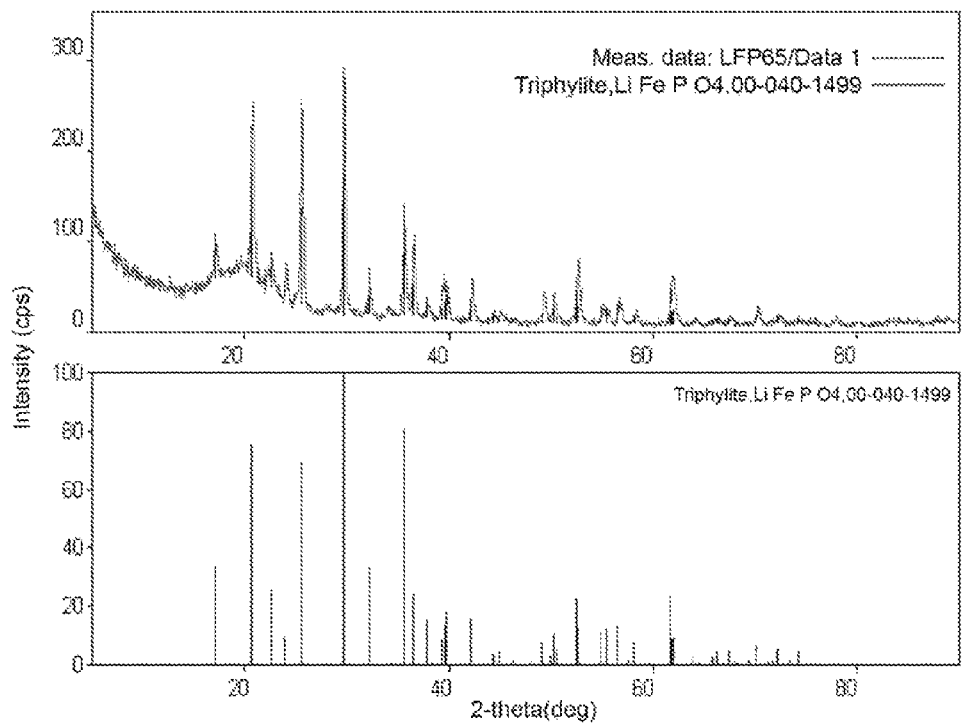
Figure 2: XRD spectrum of the powder obtained via Example 2

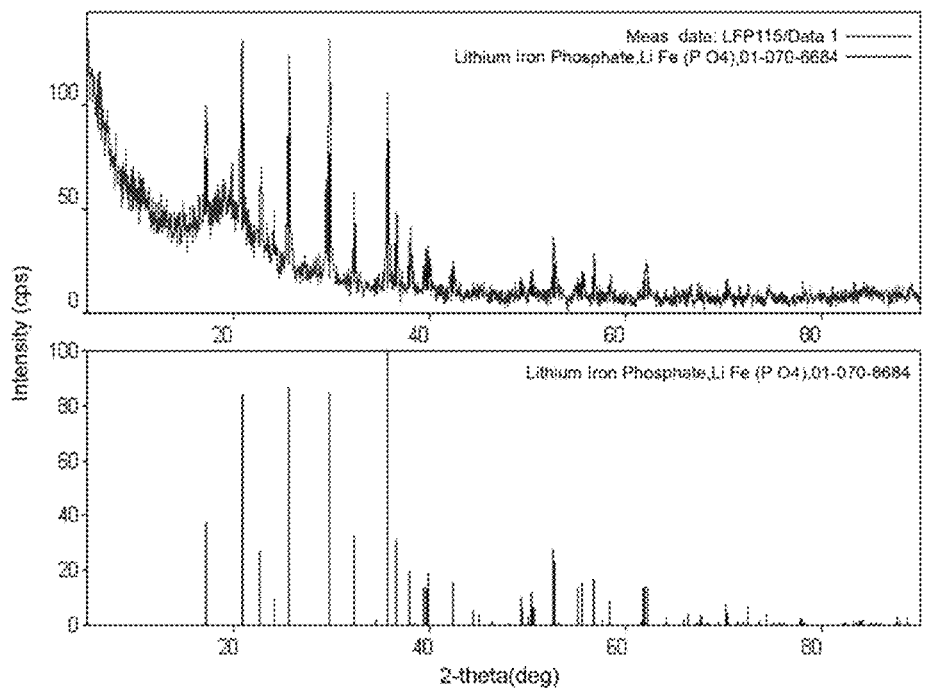
Figure 3: XRD spectrum of the powder obtained via Example 3
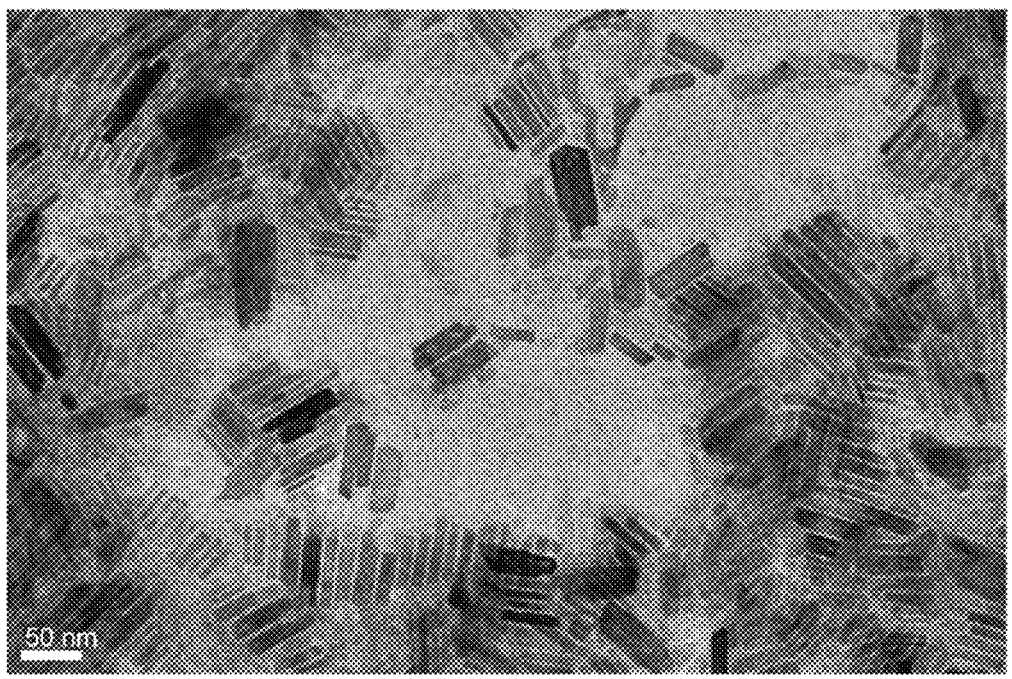
Figure 4:
TEM image of the LiFePO4 nanocrystals (in plate form) obtained via Example 1

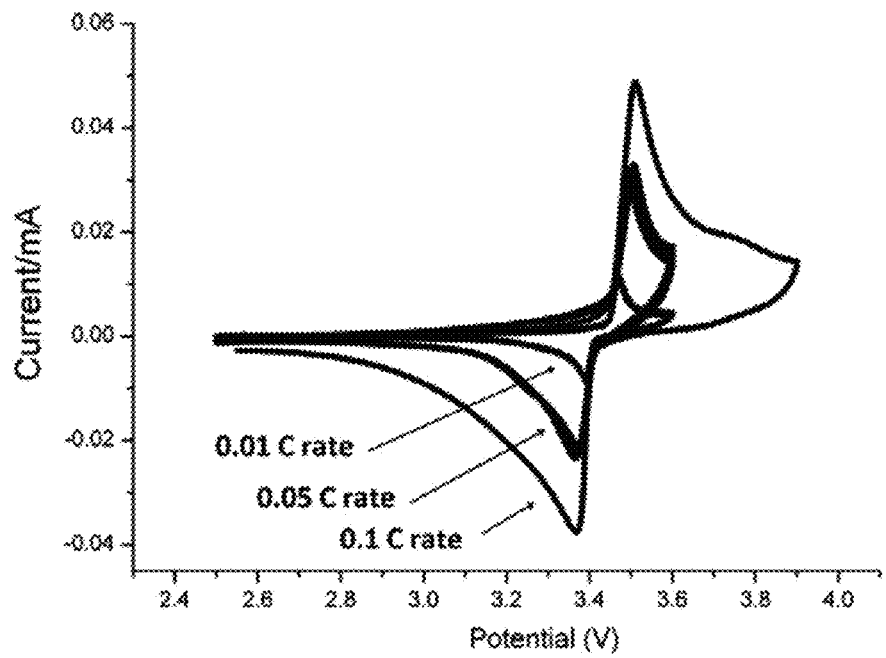
Figure 5: graph of the current as a function of the potential, obtained on the lithium iron phosphate powder resulting from Example 1
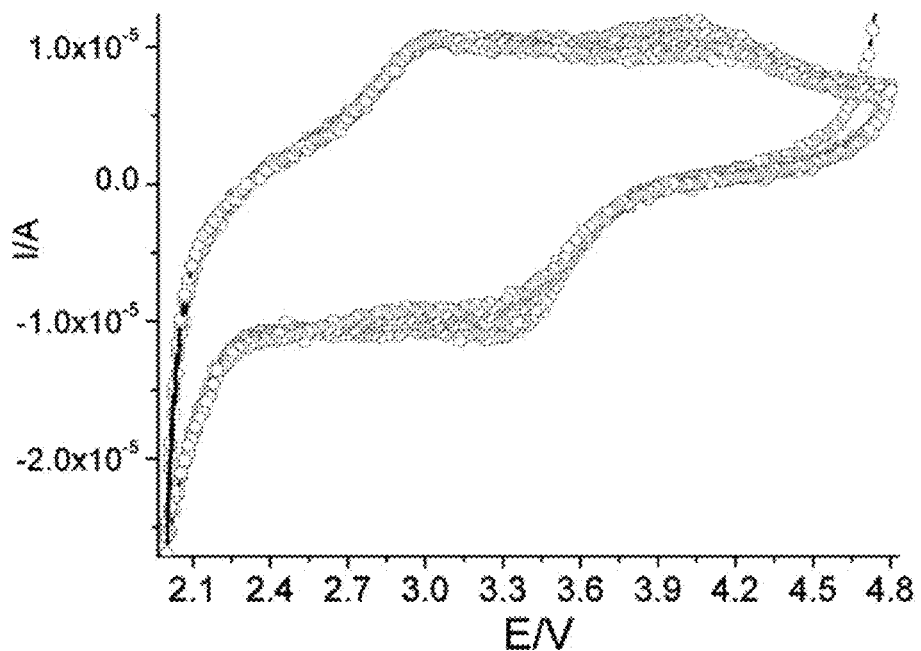
Figure 6: current as a function of the potential, obtained on the powder synthesized via Example 2

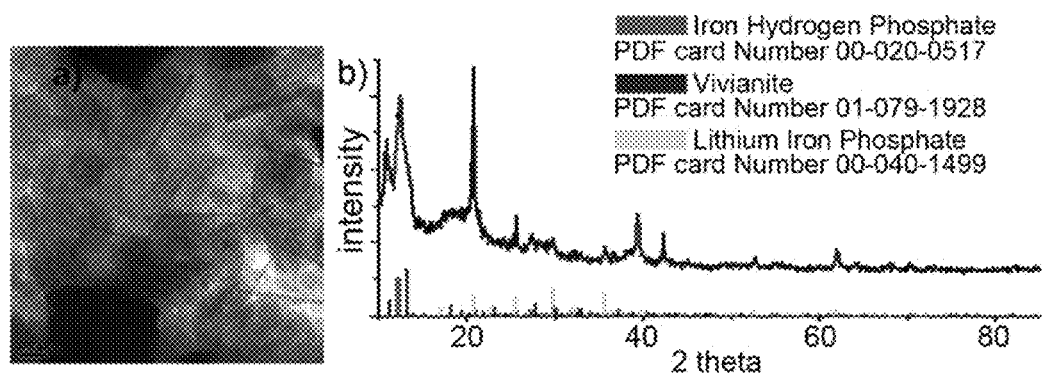
Figure 7a): TEM image of the nanocrystals resulting from Example 4
Figure 7b) corresponding XRD spectrum

METHODS FOR THE COLLOIDAL SYNTHESIS OF LITHIUM IRON PHOSPHATE

CROSS-REFERENCE TO RELATED APPLICATIONS

This application is a National Phase Application of PCT International Application No. PCT/IB2013/056465, International Filing Date, Aug. 7, 2013, claiming priority to Italian Patent Application No. TO2012A000709, filed Aug. 7, 2012, each of which is hereby incorporated by reference in its entirety.

FIELD OF THE INVENTION

The present invention relates to a process for preparing lithium iron phosphate, via a colloidal synthesis which makes it possible to obtain nanocrystals that may be used as cathodes in lithium batteries.

BACKGROUND OF THE INVENTION

Lithium iron phosphate ($LiFePO_4$), which has an olivine structure, is a material of appreciable interest in the power sector, particularly as a cathode material for lithium batteries. Its main advantages over lithium cobalt oxide lie in its low cost and its low environmental impact.

Lithium iron phosphate has an olivine structure in which the lithium present between the layers may be extracted and transferred to the anode in the charging process, compensated for by the oxidation of the iron, which passes from its oxidation state +2 to +3. This process may be hampered by impurities, and, as a result, there is particular interest in producing lithium iron phosphate that is substantially free of impurities.

The theoretical capacity of the electron extraction process is 170 mAh·$g^{-1}$; the main limitation of the material is its low conductivity; this problem may be solved by making use, after the synthesis, of a carbon coating.

To solve the problem of the low conductivity, other routes were explored, including reduction of the particle sizes and the production of a uniform particle size distribution, adaptation of the morphology and structure of the particles via low-temperature synthetic processes and selective doping with multivalent cations to increase the intrinsic conductivity. In this context, the synthesis of nanocrystalline materials also assumes relevance.

There is, therefore, a need for novel production processes, which operate at low temperature and which can produce nanocrystalline particles with a narrow particle size distribution.

A full review of the state of the art relating to processes for synthesizing lithium iron phosphate powders is given by Jugovic D. et al in *Journal of Power Sources* 190 (2009) 538-544, the content of which is incorporated herein by way of reference.

In summary, the main processes for producing lithium iron phosphate comprise:
- synthesis by solid-state reaction, in which stoichiometric amounts of iron(II) acetate, ammonium phosphate and lithium carbonate are heated to the decomposition temperature of 300 to 400° C., under an inert atmosphere, and are then calcined at a temperature of 400 to 800° C. in an oven. Via this method, it is, however, not possible to control the size of the particles, which are very large;
- solid-state microwave synthesis, in which the precursors in solid state, rather than being calcined, are irradiated with microwave radiation, by virtue of the fact that iron(II) lactate or acetate acts as a radiation absorber;
- solution synthesis via hydrothermal/solvothermal, sol-gel or coprecipitation processes.

When compared with the solid-state reaction processes, the above processes have the advantage of affording better homogeneity and mixing of the starting compounds at the molecular level;
- among the solution processes mentioned above, the hydrothermal route is often adopted.

Tajimi et al. in *Solid State Ionics* 175 (2004), 287-290 proposed a synthesis in an autoclave by mixing $LiOH.H_2O$, $FeSO_4.7H_2O$ and $H_3PO_4$ in a 3:1:1 ratio in water. The addition of PEG (in excess relative to the lithium with a 2:1 ratio) makes it possible to reduce the sizes to a level of one micron.

Huang et al. in *Materials Characterization* 61 (2010), 720-725 proposed a synthesis of nanorods with orders of magnitude of 400-500 nm via a hydrothermal route. $LiFePO_4$ is synthesized by reacting iron sulfate, ammonium phosphate and lithium hydroxide (in a 2:1:1 ratio). Sucrose is added to the mixture, which presumably acts as a growth regulator. The reaction is performed at about 220° C. in a Teflon tube for 18 hours.

Recently, Goodenough et al. in *J. Am. Chem. Soc.* (2011), 133, 2132-2135 proposed a hydrothermal synthesis using ethylene glycol and ethylenediamine as complexing agents. Microparticles composed of an assembly of nanoleaflets with a thickness of 80 nm are produced: the structure has a high surface area. Once coated with carbon, the microparticles achieve a capacity of 120 mAh·$g^{-1}$.

Aimable et al. in *Solid State Ionics* 180 (2009), 861-866 proposed a hydrothermal synthesis under supercritical conditions via a continuous synthetic process.

Peng et al. in *J. Power Source* (2010) DOI:10.1016/j.jpowsour.2010.10.065 proposed a sol-gel synthesis of lithium iron phosphate/carbon in which iron(II) phosphate, $LiOH.2H_2O$, oxalic acid and glucose are dissolved in water and stirred at 90°, and the solution is then heated to 300° under an argon atmosphere; the process includes a final calcination of the crystals at 600° for 6 hours, to produce crystals of submicron size.

In general, the hydrothermal processes are suitable for working at relatively low temperatures, but long reaction times are however required (up to 24 hours).

Further synthetic routes comprise a microemulsion reaction, described by Xu et al. in *Materials Chemistry and Physics* 105 (2007), 80-85, and pyrolytic synthesis, described by Konarova et al. in *Journal of Power Sources* 194 (2009) 1029-1035. In this synthesis, lithium acetate, iron(II) chloride and phosphoric acid are mixed together in water in a stoichiometric ratio, the solution is atomized and the drops are conveyed into a chamber heated to about 500°; the crystals are subsequently milled by wet-ball milling, to obtain crystals of the order of a micron. The process therefore requires high temperatures and subsequent processing of the prepared product.

SUMMARY OF THE INVENTION

One object of the present invention is to provide a novel process for producing lithium iron phosphate, which is suitable for working at low temperature, which is quick and economical and which is suitable for obtaining a nanocrystalline product.

Another object of the invention is to provide a process which is suitable for obtaining lithium iron phosphate that is substantially free of iron oxide impurities.

The abovementioned objects are achieved by means of colloidal synthetic methods described and claimed herein, which are also related to the production of lithium manganese phosphate and lithium iron manganese phosphate, the methods according to the invention being suitable for the production of such salts.

BRIEF DESCRIPTION OF THE FIGURES

FIGS. 1, 2 and 3 show powder XRD spectra of lithium iron phosphate obtained according to Examples 1 to 3;

FIG. 4 shows the LiFePO$_4$ nanoplatelets obtained as shown in Example 1;

FIG. 5 is a graph of the current as a function of the potential, obtained on the lithium iron phosphate powder resulting from Example 1 which follows, at various sweep speeds (0.01 C, 0.05 C and 0.1 C);

FIG. 6 is a graph of the current as a function of the potential, obtained on the lithium iron phosphate powder resulting from Example 2 which follows;
  at 3.9 V the flexion of the curve corresponds to the redox energy on passing from LiFePO$_4$ to FePO$_4$, whereas the flexion at 3.3 V corresponds to the oxidation process;

FIG. 7a) is a TEM image of the nanocrystals obtained from Example 4; and

FIG. 7b) is the corresponding XRD spectrum.

DETAILED DESCRIPTION

In the colloidal synthesis that is the subject of the invention, the lithium salt is preferably chosen from the acetate, carbonate, hydroxide and halide, in particular chloride, bromide and iodide.

The iron (or manganese) halide is preferably iron(II) (or manganese(II)) chloride.

The phosphorus compound, which is capable of releasing the phosphate ion under the reaction conditions, is preferably phosphoric acid or ammonium phosphate, in particular dibasic ammonium phosphate.

The use of the abovementioned preferred phosphorus compounds improves the purity of the lithium iron phosphate, in particular by avoiding the formation of other phosphates such as lithium phosphate and iron hydrogen phosphate (see Example 4).

The synthetic reaction is performed in the presence of an organic surfactant or a mixture of organic surfactants, comprising a long-chain alkylamine or alkenylamine (for example containing from 14 to 20 carbon atoms), the said organic surfactant being capable of dissolving the lithium salt and the iron (and/or manganese) halide, where used, i.e. the components of the surfactant mixture being individually capable of dissolving, respectively, the lithium salt and the iron (and/or manganese) halide.

In particular, oleylamine and/or octadecylamine or a mixture of surfactants comprising oleylamine and/or octadecylamine in combination with oleic acid and/or hexadecanediol may be used as organic surfactant.

The mole ratio between the surfactant or mixture of surfactants and iron or manganese may preferably be between 4 and 45.

The organic solvent is a compound that is liquid at room temperature, in which the said surfactant or mixture of surfactants is fully soluble; it is preferred to use 1-octadecene since it allows better control over the growth of the nanocrystals; however, other solvents may be used, for instance hexyl ether $(C_6H_{13})_2O$, octyl ether $(C_8H_{17})_2O$, phenyl ether $(C_6H_5)_2O$ and benzyl ether $(C_7H_7)_2O$.

The preferred embodiment of the process according to the invention envisages the reaction of lithium iodide with iron (II) (and/or manganese(II)) chloride, and with phosphoric acid or dibasic ammonium phosphate, in the presence of oleylamine or octadecylamine, in 1-octadecene as solvent.

In this embodiment, it is particularly preferred to use oleylamine and dibasic ammonium phosphate.

In this embodiment, the lithium iodide used as lithium precursor and similarly the iron(II) chloride and the manganese(II) chloride used, respectively, as iron and manganese precursors, are soluble in the alkylamine or alkenylamine, and as such it is possible to use a single surfactant. This embodiment of the process is suitable for avoiding the formation of iron oxide, which would constitute an undesired impurity that would have to be removed.

The use of dibasic ammonium phosphate $(NH_4)_2HPO_4$ is preferred over the use of phosphoric acid, for the purpose of avoiding the possible reaction of phosphoric acid with iron (or with manganese), which would also lead to the production of iron (or manganese) oxide.

The use of oleylamine is preferred relative to the use of octadecylamine since oleylamine is liquid, whereas octadecylamine is solid and its use entails laborious operations for cleaning the reactor.

It is preferred to use a total amount of amine so as to maintain a (highly) reducing medium; the mole ratio between the amine and iron or manganese may be between 15 and 45.

In another embodiment, which is, however, less preferred relative to that described previously, since it may include the formation of iron (or manganese) oxide impurities that need to be removed, the process according to the invention may be performed using a lithium salt chosen from the acetate, carbonate, hydroxide, chloride or bromide; the abovementioned salt is preferably reacted with iron(II) chloride (and/or manganese(II) chloride) in the presence of phosphoric acid and a mixture of surfactants comprising or consisting of oleic acid or hexadecanediol and octadecylamine, in a solvent which is preferably 1-octadecene.

In this case, the abovementioned lithium salts are insoluble in amine, wherein the use of oleic acid or hexadecanediol to dissolve the lithium salt is required. It is presumed that the reaction mechanism involves the cleavage of the Li salt by the surfactant with the formation of a bond between the oxygen of the acid or of the diol with the lithium. Phosphoric acid reacts with the amine to produce the phosphate ion, which in turn will react with the Li$^+$ ion and Fe$^{2+}$/Mn$^{2+}$.

In this embodiment, the mole ratio between the total amount of surfactant and iron or manganese is preferably between 4 and 15.

In this process, the formation of iron (or manganese) oxide impurities is presumably due to the reaction of iron(II) chloride and/or manganese(II) chloride with oleic acid or hexadecanediol. The iron or manganese oxide impurity may, however, be removed via purification processes, for example by magnetic separation, selective precipitations and chemical treatments.

In the process according to the invention, a lithium/iron or Mn/PO$_4$ atomic ratio of between 1:1:1 and 3:1:1 is preferably used, the optimum condition being considered to be a 1.5:1:1 ratio. The reaction is generally performed at a temperature of between 250 and 400° C. for times preferably of between 30 minutes and 180 minutes, preferably under an inert atmosphere (stream of nitrogen or argon); temperatures close to the upper value of 400° C., for example 380° C., allow the use of an atomic ratio close or equal to 3:1:1; the use of excess lithium in such a ratio is not desirable since a large excess of lithium impedes the formation of lithium iron phosphate.

In a preferred embodiment, the process comprises a first phase of heating to an intermediate temperature of about 100-120° C. and maintaining the reaction mixture at this temperature for a time sufficient to achieve degassing of the solution; for example, the degassing may be performed for 1 hour at 120° C.

Next, under a stream of nitrogen (or argon), the solution is preferably heated to 250° C., for example for 30 minutes.

It was noted that at a temperature of about 300° C., the powder obtained starts to become magnetic, presumably due to a reaction between the iron and the phosphate.

The subsequent phases of the process include cooling the solution to room temperature, the addition of a solvent, for example toluene, and a phase of precipitation of the nanocrystals, preferably by addition of an alcohol such as methanol, under an inert atmosphere.

The precipitate may be redissolved in toluene, from which the nanocrystals may be precipitated again by adding ethanol or methanol; this last procedure may be repeated several times to eliminate the impurities.

The process enables the production of crystals with a size of between 400 nm and 200 nm.

EXAMPLE 1

0.090 g of lithium iodide, 0.060 g of dibasic ammonium phosphate, 0.063 g of anhydrous iron chloride, 5 ml of oleylamine and 5 ml of 1-octadecene are mixed together in a 50 ml Pyrex glass round-bottomed flask. The solution is degassed at 120° C. for 1 hour and then heated to 250° C. and maintained at this temperature for 3 hours, under a stream of nitrogen, until it becomes white. At this point, lithium iron phosphate is obtained. Next, the solution is cooled to room temperature, 5 ml of toluene are added and the resulting solution is transferred into a glove box, where the nanocrystals are precipitated out by adding methanol under an inert atmosphere. The precipitate is then dissolved in toluene, from which the nanocrystals may be precipitated again by adding ethanol. This last procedure may be repeated several times to remove the various impurities.

The XRD spectrum of the powder obtained is shown in FIG. 1.

EXAMPLE 2

0.060 g of lithium acetate (0.9 mmol), 0.066 g of phosphoric acid (0.7 mmol), 0.063 g of iron(II) chloride (0.5 mmol), 0.50 g of hexadecanediol (2 mmol), 0.53 g of octadecylamine (2 mmol) and 10 ml of 1-octadecene are mixed together in a 50 ml Pyrex glass round-bottomed flask. The mixture is degassed at 120° C. under vacuum until the solution becomes black. After about 1 hour, the vacuum is broken and a stream of inert gas (nitrogen or argon) is passed through the flask, after which the temperature of the mixture is raised to 300° C. and maintained at this value for 30 minutes, while maintaining a moderate stream of inert gas. The subsequent precipitation and purification phases are performed in accordance with that described in Example 1.

The spectrum of the lithium iron phosphate obtained according to Example 2 is shown in FIG. 2.

EXAMPLE 3

Example 2 is repeated under the same conditions and with the same reagents, but using 1.5 ml of oleic acid (6 mmol) instead of hexadecanediol.

The spectrum of the lithium iron phosphate obtained according to Example 3 is shown in FIG. 3.

EXAMPLE 4

Example 1 was repeated, as described, replacing 0.060 g of dibasic ammonium phosphate with an equimolar amount of tris(2-ethylhexyl)phosphate (0.5 mmol, 0.21 g, 0.23 ml).

Lithium iron phosphate incorporating impurities of hydrated iron phosphate (vivianite) and iron hydrogen phosphate was obtained, as illustrated by the diffraction diagram in FIG. 7b).

The process according to the invention makes it possible to exert control over the particle sizes, since the organic surfactants used regulate the growth of the crystal and its phase.

The process makes it possible to work at atmospheric pressure with relatively low temperatures compared with other conventional syntheses, with the possibility of using a lithium/iron/PO$_4$ ratio of 1.5:1:1, which is low relative to that generally used in the literature (3:1:1) and makes it possible to use a reduced amount of lithium for the production of lithium iron phosphate.

The electrochemical novelty of the product obtained may be summarized in three points:

higher charging and discharging speed of the crystal (lithiation and delithiation) relative to known products, the crystal structure is very stable during the charging and discharging processes, and the reduced dimensions allow the insertion of crystals into polymer matrices.

The invention claimed is:

1. A method for the production of lithium iron phosphate, lithium manganese phosphate or lithium iron manganese phosphate, through colloidal synthesis, comprising the step of reacting lithium iodide, iron (II) chloride and/or a manganese (II) chloride and a phosphorus compound selected from the group consisting of: phosphoric acid, dibasic ammonium phosphate and mixtures thereof, in the presence of a surfactant or mixture of surfactants comprising oleylamine and/or octadecylamine, in 1-octadecene as a solvent, the reaction being conducted at a temperature not lower than 250° C., wherein the mole ratio between amine and iron or manganese is between 15 and 45.

2. The method of claim 1, wherein the phosphorus compound is dibasic ammonium phosphate and wherein oleylamine is used as the sole surfactant.

3. The method of claim 1, wherein the reaction is carried out at a temperature between 250 and 400° C.

4. The method of claim 1 comprising an initial stage of degassing the mixture of reagents at a temperature above 100° C., followed by heating at a temperature between 250 and 400° C., for a time from 30 minutes to three hours.

5. The method of claim 1, wherein in the mixture of reagents, the atomic ratio lithium/iron and/or manganese/PO$_4$ is between 1:1:1 and 3:1:1.

6. A method for the production of lithium iron phosphate, lithium manganese phosphate or lithium iron manganese phosphate, through colloidal synthesis, comprising the step of reacting a lithium salt, selected from the group consisting of: acetate, carbonate, hydroxide, chloride and bromide with iron (II) chloride and/or manganese (II) chloride and phosphoric acid, in the presence of a surfactant comprising octadecylamine in admixture with oleic acid or hexadecanediol, in 1-octadecene as a solvent, the reaction being conducted at a temperature not lower than 250° C.

7. The method of claim 6, wherein the mole ratio between surfactant and iron or manganese is between 4 and 15.

8. The method of claim 6, wherein the reaction is carried out at a temperature between 250 and 400° C.

9. The method of claim 6 comprising an initial stage of degassing the mixture of reagents at a temperature above 100° C., followed by heating at a temperature between 250 and 400° C., for a time from 30 minutes to three hours.

10. The method of claim 6, wherein in the mixture of reagents, the atomic ratio lithium/iron and/or manganese/$PO_4$ is between 1:1:1 and 3:1:1.

* * * * *